United States Patent
Lynch

(10) Patent No.: US 9,815,476 B2
(45) Date of Patent: Nov. 14, 2017

(54) METHOD AND APPARATUS FOR PROVIDING ROAD SURFACE FRICTION DATA FOR A RESPONSE ACTION

(71) Applicant: HERE Global B.V., Veldhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/578,956

(22) Filed: Dec. 22, 2014

(65) Prior Publication Data

US 2016/0176408 A1     Jun. 23, 2016

(51) Int. Cl.
*G01C 22/00* (2006.01)
*B60W 40/064* (2012.01)
*B60W 40/068* (2012.01)
*B60W 50/08* (2012.01)
*B60W 50/00* (2006.01)

(52) U.S. Cl.
CPC ........ *B60W 40/064* (2013.01); *B60W 40/068* (2013.01); *B60W 50/082* (2013.01); *B60W 2050/0077* (2013.01); *B60W 2550/12* (2013.01); *B60W 2550/148* (2013.01)

(58) Field of Classification Search
CPC ........... B60W 40/064; B60W 40/0968; B60W 50/082; B60W 2550/12; B60W 2550/148
USPC ............... 701/23, 72, 80, 400, 410
See application file for complete search history.

(56) References Cited

U.S. PATENT DOCUMENTS

| | | | | |
|---|---|---|---|---|
| 4,866,625 A | * | 9/1989 | Kawamoto | B60K 23/0808 180/233 |
| 5,276,620 A | * | 1/1994 | Bottesch | B62D 6/04 180/422 |
| 5,369,591 A | * | 11/1994 | Broxmeyer | G05D 1/0261 180/167 |
| 5,774,069 A | * | 6/1998 | Tanaka | B60T 7/12 180/167 |
| 6,151,539 A | * | 11/2000 | Bergholz | G01S 13/931 340/435 |

(Continued)

FOREIGN PATENT DOCUMENTS

DE   102012014457 A1   1/2014
EP       1150266 A2   10/2001

(Continued)

OTHER PUBLICATIONS

Office Action for corresponding European Patent Application No. 15201697.8-1752 dated May 18, 2016, 10 Pages.

*Primary Examiner* — Shardul Patel
(74) *Attorney, Agent, or Firm* — Ditthavong & Steiner, P.C.

(57) ABSTRACT

An approach is provided for determining road surface friction data for at least one travel segment via sensor data and/or guideline friction map to cause at least one response action. The approach involves processing and/or facilitating a processing of sensor data to determine at least one road-vehicle friction change associated with at least one travel segment. The approach also involves causing, at least in part, a comparison of the at least one road-vehicle friction change to at least one guideline friction map. The approach further involves determining at least one response action to the at least one road-vehicle friction change based, at least in part, on the comparison.

22 Claims, 14 Drawing Sheets

(56) References Cited

U.S. PATENT DOCUMENTS

| | | | |
|---|---|---|---|
| 2006/0041365 A1* | 2/2006 | Mori | B60T 8/172 701/70 |
| 2007/0061061 A1* | 3/2007 | Salman | B60T 8/172 701/80 |
| 2008/0051971 A1* | 2/2008 | Sung | G08G 1/092 701/93 |
| 2010/0211256 A1* | 8/2010 | Takenaka | B60T 8/172 701/31.4 |
| 2012/0059547 A1* | 3/2012 | Chen | B60W 10/04 701/37 |
| 2013/0144521 A1* | 6/2013 | Mathieu | G01C 21/365 701/410 |
| 2014/0074388 A1* | 3/2014 | Bretzigheimer | B60T 1/10 701/117 |
| 2015/0154864 A1* | 6/2015 | Hainzlmaier | G08G 1/09626 340/905 |
| 2015/0166072 A1* | 6/2015 | Powers | B60W 40/06 701/1 |
| 2015/0241878 A1* | 8/2015 | Crombez | G05D 1/0088 701/23 |
| 2015/0254986 A1* | 9/2015 | Fairfield | G08G 1/22 707/687 |
| 2016/0107655 A1* | 4/2016 | Desnoyer | B60W 50/14 701/23 |

FOREIGN PATENT DOCUMENTS

| | | |
|---|---|---|
| EP | 2889583 A1 | 7/2015 |
| JP | 2011186577 A | 9/2011 |
| WO | 2010019045 A1 | 2/2010 |

\* cited by examiner

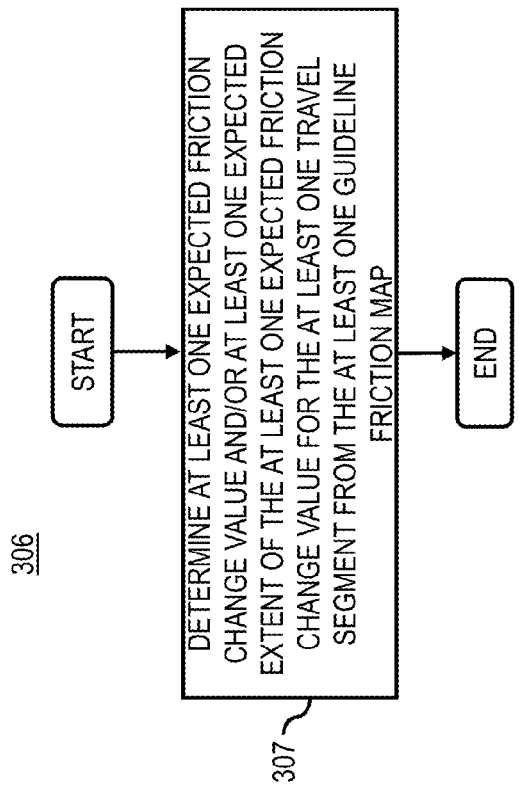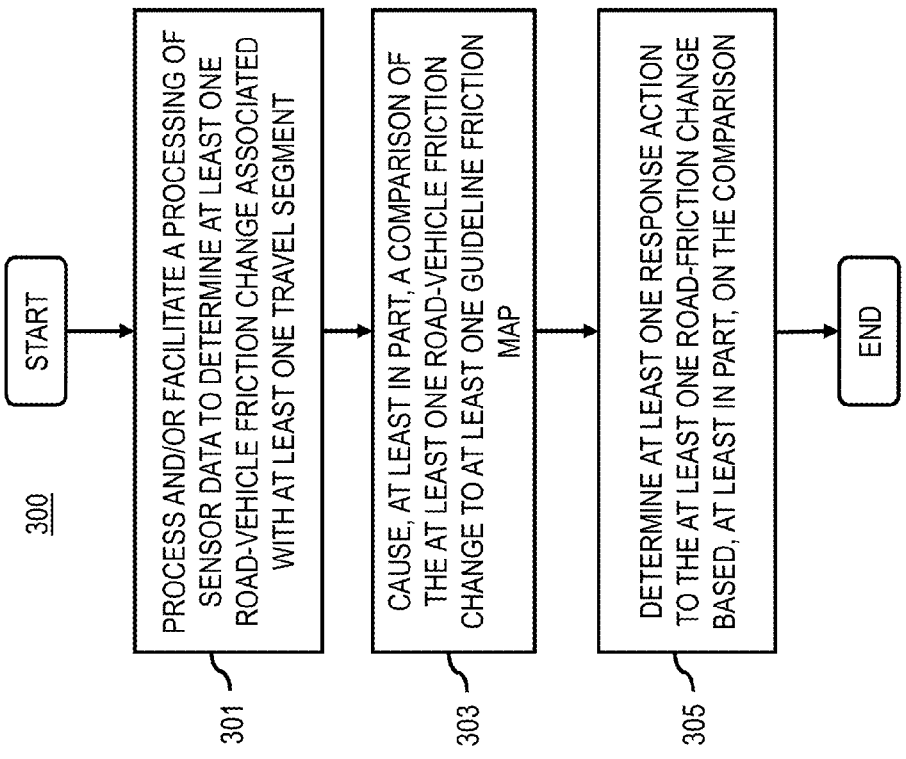

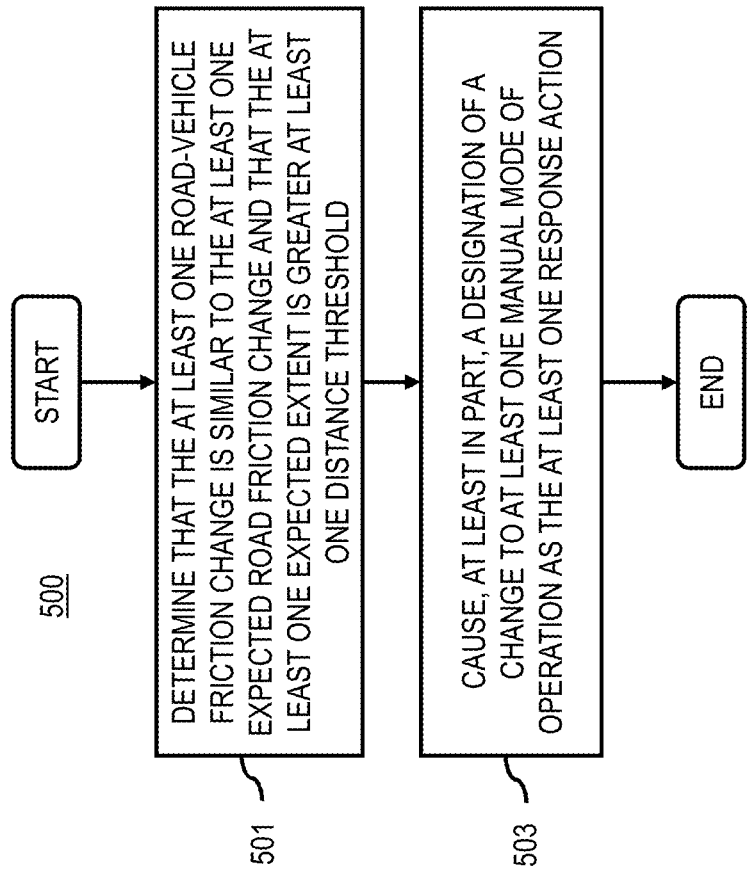

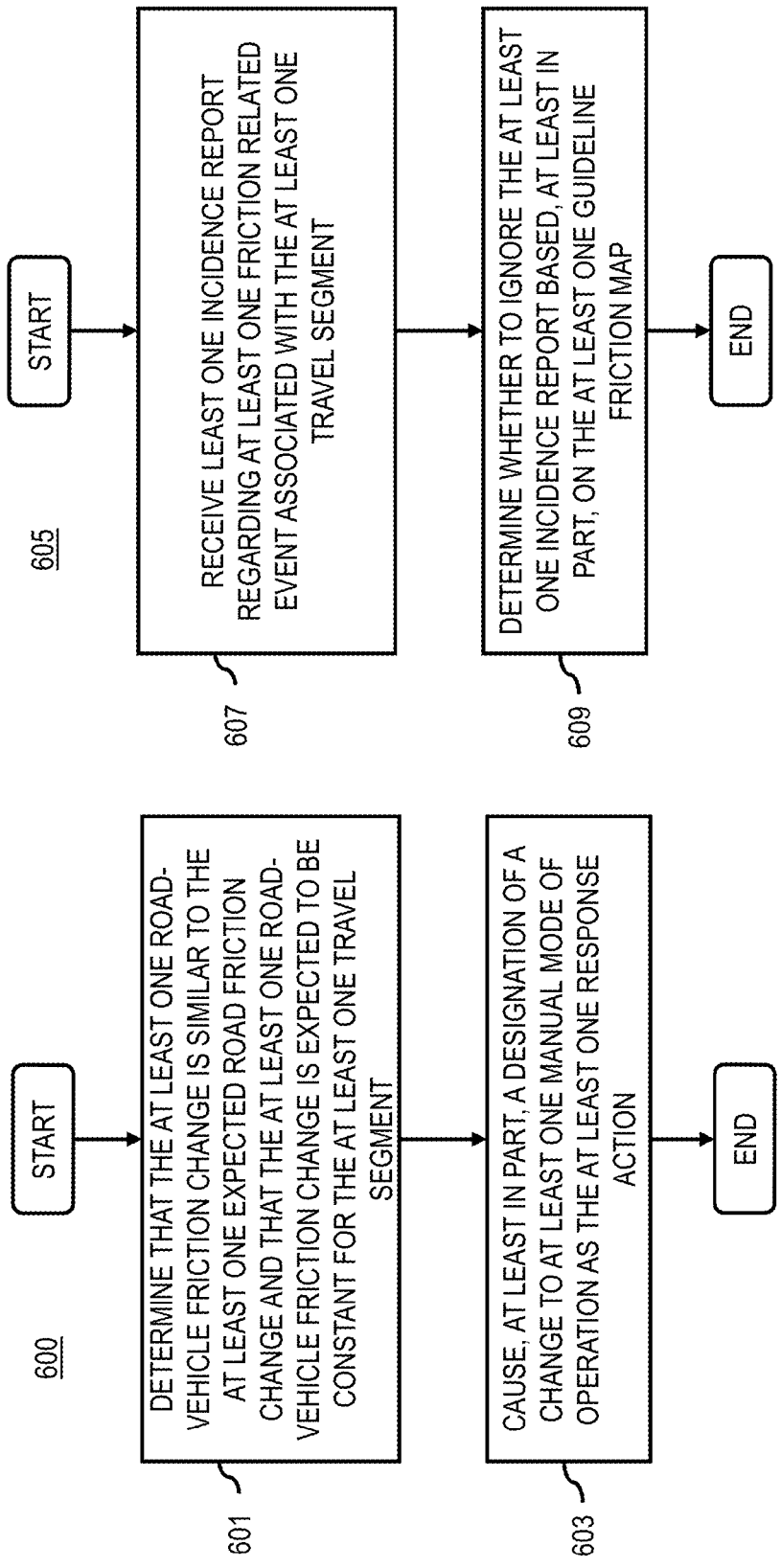

FIG. 7A

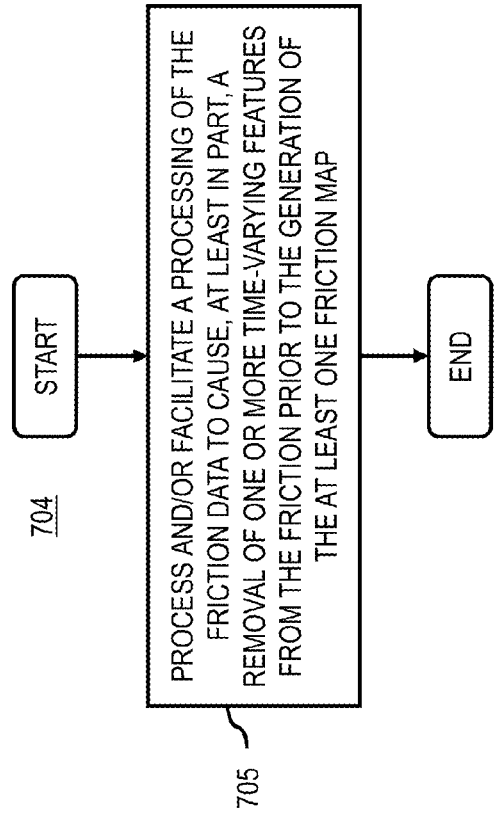

700

START → 701 CAUSE, AT LEAST IN PART, AN AGGREGATION OF FRICTION DATA FOR AT LEAST ONE TRAVEL SEGMENT, ONE OR MORE OTHER TRAVEL SEGMENTS, OR A COMBINATION THEREOF → 703 PROCESS AND/OR FACILITATE A PROCESSING OF THE FRICTION DATA TO CAUSE, AT LEAST IN PART, A GENERATION OF THE AT LEAST ONE GUIDELINE FRICTION MAP → END

FIG. 7B

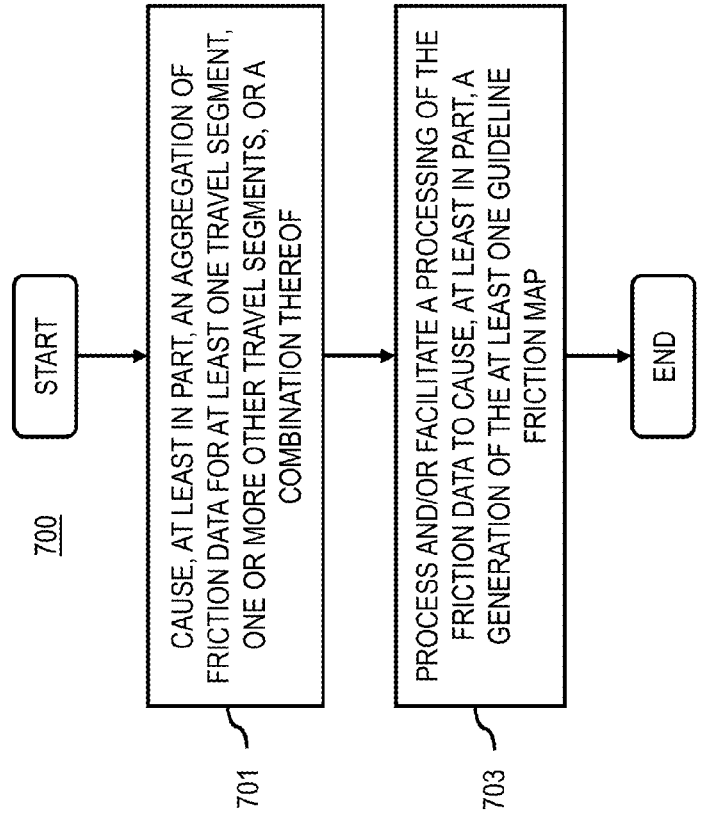

704

START → 705 PROCESS AND/OR FACILITATE A PROCESSING OF THE FRICTION DATA TO CAUSE, AT LEAST IN PART, A REMOVAL OF ONE OR MORE TIME-VARYING FEATURES FROM THE FRICTION PRIOR TO THE GENERATION OF THE AT LEAST ONE FRICTION MAP → END

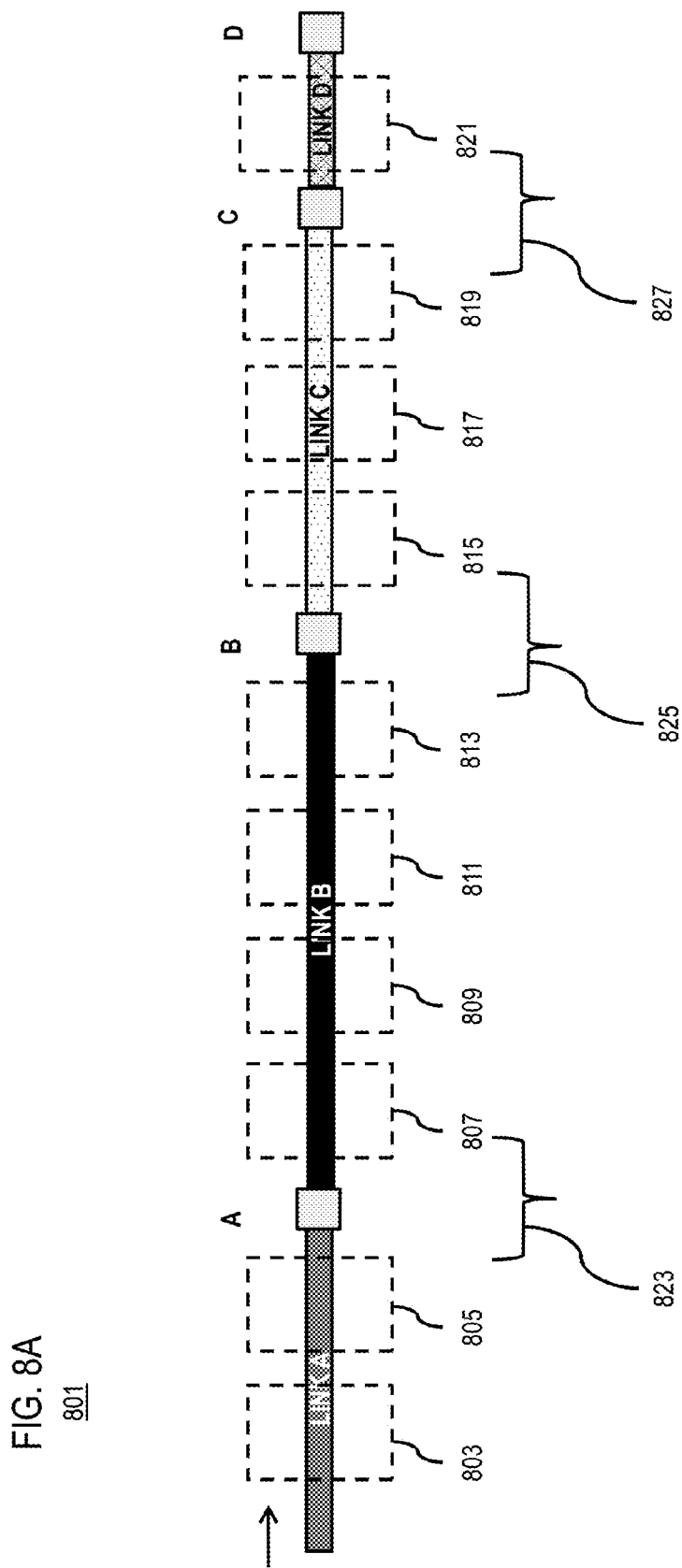

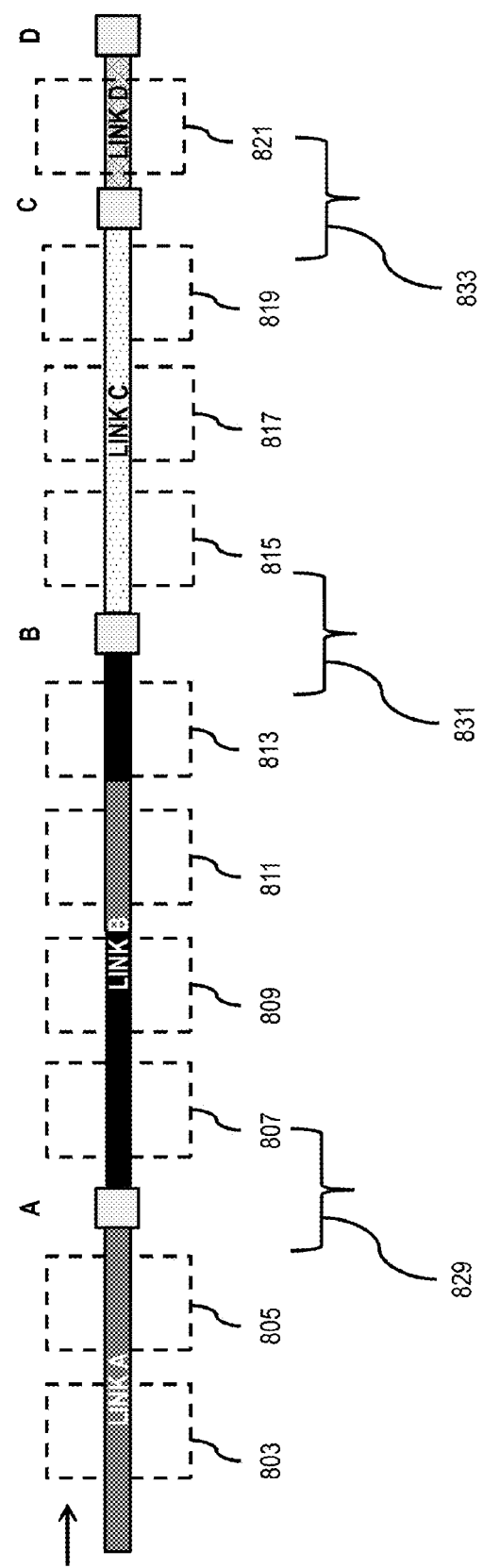

METHOD AND APPARATUS FOR PROVIDING ROAD SURFACE FRICTION DATA FOR A RESPONSE ACTION

BACKGROUND

There is an increasing interest in providing notifications on road surface friction to one or more autonomous vehicles for appropriate vehicle maneuvers (e.g., disabling autonomous driving system and returning to manual driver control). Currently, road surface friction data for a specific road link is based on reports of incidents from various data providers, and arbitrary algorithms. Since, the road surface friction analysis is not based on the actual road surface friction values, the road surface friction data are unreliable. Accordingly, service providers and device manufacturers face significant technical challenges in determining accurate road surface friction data for determining a response action to ensure safe driving operation.

SOME EXAMPLE EMBODIMENTS

Therefore, there is need for an approach for determining road surface friction data for at least one travel segment via sensor data and/or guideline friction map to cause at least one response action.

According to one embodiment, a method comprises processing and/or facilitating a processing of sensor data to determine at least one road-vehicle friction change associated with at least one travel segment. The method also comprises causing, at least in part, a comparison of the at least one road-vehicle friction change to at least one guideline friction map. The method further comprises determining at least one response action to the at least one road-vehicle friction change based, at least in part, on the comparison.

According to another embodiment, an apparatus comprises at least one processor, and at least one memory including computer program code for one or more programs, the at least one memory and the computer program code configured to, with the at least one processor, to cause, at least in part, the apparatus to process and/or facilitate a processing of sensor data to determine at least one road-vehicle friction change associated with at least one travel segment. The apparatus is also caused to cause, at least in part, a comparison of the at least one road-vehicle friction change to at least one guideline friction map. The apparatus is further caused to determine at least one response action to the at least one road-vehicle friction change based, at least in part, on the comparison.

According to another embodiment, a computer-readable storage medium carrying one or more sequences of one or more instructions which, when executed by one or more processors, cause, at least in part, an apparatus to process and/or facilitate a processing of sensor data to determine at least one road-vehicle friction change associated with at least one travel segment. The apparatus is also caused to cause, at least in part, a comparison of the at least one road-vehicle friction change to at least one guideline friction map. The apparatus is further caused to determine at least one response action to the at least one road-vehicle friction change based, at least in part, on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a flowchart of a process for determining road surface friction data for at least one travel segment via sensor data and/or guideline friction map to cause at least one response action, according to one embodiment;

FIG. 3B is a flowchart of a process for determining friction change value for at least one travel segment, according to one embodiment;

FIG. 5 is a flowchart of a process for determining manual mode of operation as a response action based, at least in part, on road-vehicle friction and/or distance threshold, according to one embodiment;

FIG. 6A is a flowchart of a process for causing, at least in part, a change in the operating mode of an autonomous vehicle based, at least in part, on road-vehicle friction change, according to one embodiment;

FIG. 6B is a flowchart of a process for selecting incident reports for a friction related event in a travel segment, according to one embodiment;

FIG. 7A is a flowchart of a process for generating a guideline friction map for the autonomous vehicle, according to one embodiment;

FIG. 7B is a flowchart of a process for removing time varying features from a friction before generating a friction map, according to one embodiment;

FIGS. 8A and 8B are diagrams for depicting interaction between a vehicle configuration platform 107 and a vehicle along a travel segment, according to one embodiment;

DESCRIPTION OF SOME EMBODIMENTS

Examples of a method, apparatus, and computer program for determining road surface friction data for at least one travel segment via sensor data and/or guideline friction map to cause at least one response action are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to highly-assisted driving (HAD) vehicles as well as to vehicles for which a change in road surface friction can be determined or recommended. Moreover, although the autonomous vehicles described are autonomous automobiles, it is contemplated that the approaches of the various embodiments described herein are applicable to any type of passenger vehicle.

Figure 1A:
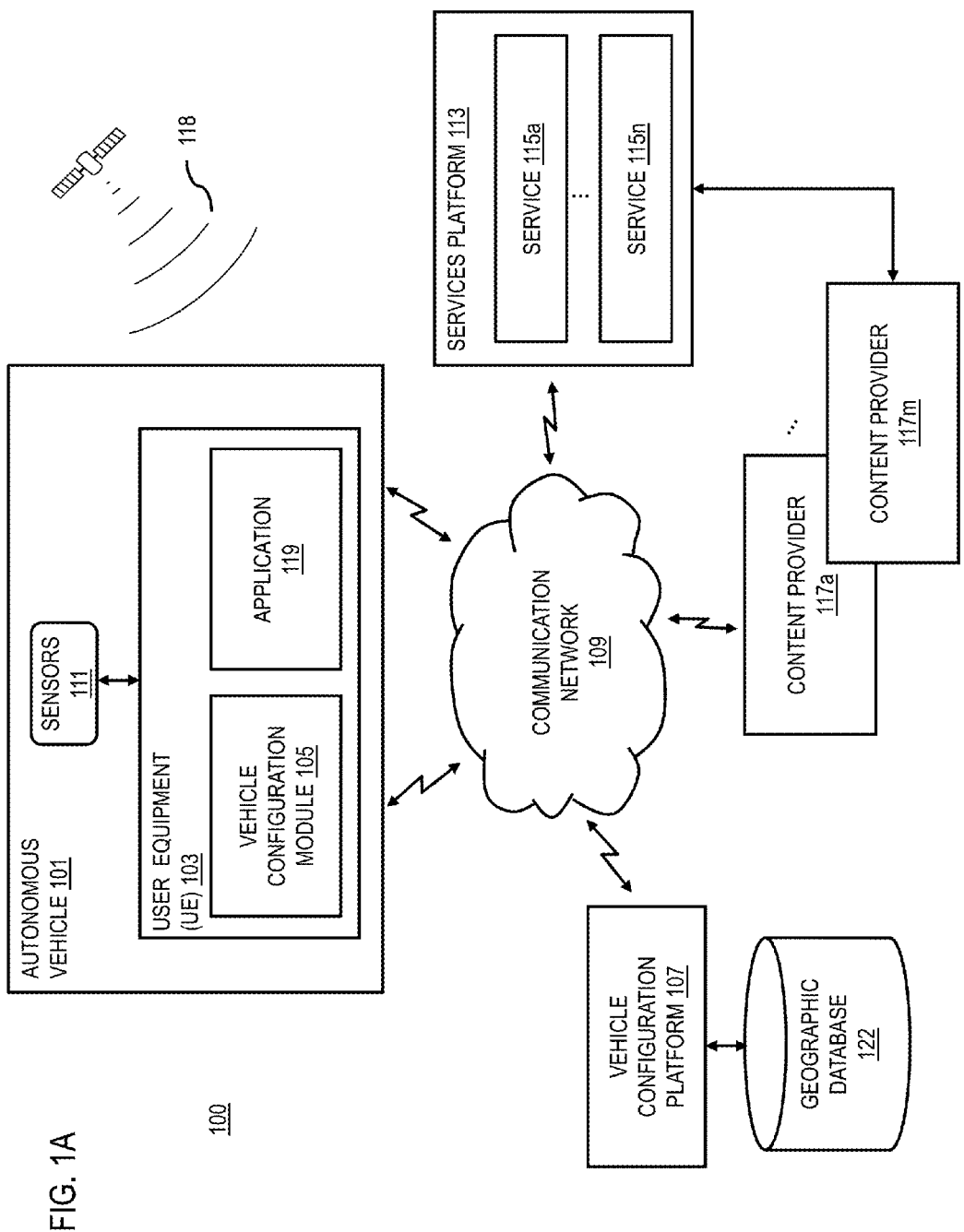
FIG. 1A is a diagram of a system capable of determining road surface friction data for at least one travel segment via sensor data and/or guideline friction map to cause at least one response action, according to one embodiment.

FIG. 1A is a diagram of a system capable of determining road surface friction data for at least one travel segment via sensor data and/or guideline friction map to cause at least one response action. For the purpose of illustration herein, operational configuration may pertain to a driving mode such as a manual driving mode or an autonomous mode of the vehicle. As noted above, autonomous vehicles are able to drive themselves without the input of vehicle passengers or occupants. The autonomous vehicles achieve this self-driving capability by using sensor systems in combination with, for instance, map data (e.g., three-dimensional map data) and information received from network-based services and/or other vehicles.

As discussed previously, service providers and device manufactures are increasingly interested in developing accurate location-based services and navigation services that improve the overall driving experience. Similarly, the effectiveness of the data relied upon by the location-based service and/or navigation service directly impacts the ability of an autonomous vehicle to operate effectively. For example, autonomous vehicles typically employ onboard navigations systems for interacting with a global positioning service, mapping service or the like to receive relevant location information, driving instructions, traffic information and other data for supporting independent navigation of the vehicle. In addition, the vehicles may rely on various sensors for perceiving its environment, including presence and/or proximity sensors, weather and road condition sensors, speed detection sensors, light intensity sensors, tire traction sensors etc. Based on this data, the vehicle may execute various actions (e.g., change operation mode from autonomous to manual or vice versa, initiate a turn, accelerate, brake) relative to the travel path upon which it is navigating.

Generally, the map data provided to the autonomous vehicle include incident reports related to the road segment being travelled. For example, an incident report may indicate that the particular road segment is slippery and therefore dangerous to drive. The slippery condition of a road is typically due to low friction of the road surface. The low friction road conditions may depend on many factors such as weather, temperature, humidity, road surface type, road surface quality, vehicle conditions, tires, etc. However, as previously discussed such incident reports are typically generated based on information provided by multiple vehicles under different driving (e.g., speed, dimensions, weight of vehicle etc.) and environmental conditions. Therefore, these incident reports may be uncertain and unreliable for vehicle of different type or configuration, at different time or condition, etc. The autonomous vehicle may therefore rely on this incident data and frequently shift the operating modes (e.g., autonomous and manual modes), thereby resulting in a poor user experience.

To address this problem, a system 100 of FIG. 1A provides operational configuration for autonomous vehicle based on road-vehicle friction data. For example, the road-vehicle friction relates to the friction between the road surface and the tires of the vehicle. As such, a low value of road-vehicle friction indicates a slippery surface that may therefore be dangerous to drive. For example, in one embodiment, the system 100 comprises an autonomous vehicle 101 configured with at least one user equipment (UE) 103 including a vehicle configuration module 105 that provides functions related to determining road friction data for the autonomous vehicle 101 by using a change in road surface friction as described in the various embodiments discussed herein. In one embodiment, the autonomous vehicle 101, the UE 103, and/or the vehicle configuration module 105 has connectivity to a vehicle configuration platform 107 over a communication network 109. By way of example, the vehicle configuration module 105 is a network component that can perform all or a portion of the functions of the vehicle configuration platform 107 by interacting with the vehicle configuration platform 107 over the communication network 109.

In one embodiment, the system 100 determines a normal surface friction map wherein the expected friction under normal conditions for all road segments are aggregated rather than just capturing incident reports of unusual events. In another embodiment, the system 100 may provide a confidence level to existing onboard tire traction computations to determine normal or unusual circumstances for one or more autonomous vehicles to return to manual control. In a further embodiment, the system 100 may stores surface friction for the entire map, thereby computing the relative change in average surface friction along any road link. As a result, providing an indication of friction differences based solely on road surface conditions that are independent of weather, temperature, driving style, etc.

In a further embodiment, the friction values may be normalized by observing similar relative changes and then adjusting (normalizing) the absolute friction values. In a simplified example, vehicle X reports friction of the road at points A, B, and C as 0.7 and at point's D, and E as 0.9. However, another vehicle, Y, may specify the friction at points A, B, and C as 0.75 and at points D and E as 0.95. Since the relative changes are similar, it might be considered that vehicle Y's is actually experiencing the same road conditions, but the vehicle itself is introducing bias. In this case, the recorded friction values may be normalized to reduce the bias. In this case, the normalization process might reduce Vehicle Y friction values by 0.05. In one scenario, calculating absolute friction is difficult, and relative changes are easier to compare. If the relative changes are similar (e.g., same shape of the friction profile along the road (i.e., derivatives/slope are the same)) then the vehicle configuration platform 107 may attempt to remove the bias. In another scenario, most computation and prediction cases may probably ignore the actual (absolute) friction value and only consider changes in the friction value along the road. However, with a large sample size and enough data to reliably calculate the friction bias of each vehicle, the vehicle configuration platform 107 may be able to create a usable absolute friction value.

In one embodiment, the system 100 may map a change in road surface quality since time-varying features are removed from friction (assuming the data is aggregated over a long period). Further, system 100 may reduce reporting of false incidents by consulting any reporting with the historical friction map and relative friction map.

Although the UE 103 is depicted as a separate component from the autonomous vehicle 101, it is contemplated that the functions of the UE 103 and/or the vehicle configuration module 105 may be performed or embedded in the autonomous vehicle 101 or a component of the autonomous vehicle 101. As shown, the autonomous vehicle 101 is further configured with the sensors 111 to assist with autonomous driving. For example, the sensors 111 may include tire traction sensors, infrared sensors, lasers, radar, sonar, cameras (e.g., visible, night vision, etc.), and/or other devices/sensors that can scan and record data from the autonomous vehicle 101's surroundings for determining road-vehicle friction change associated with a travel segment via the autonomous vehicle 101. In one embodiment, the travel segment may be considered as a small distance yet to be travelled by the autonomous vehicle 101. In one embodiment, the system 100 uses the sensors 111 of the autonomous vehicle 101 to detect road-vehicle friction.

In one embodiment, the sensor data can be supplemented with additional information from network-based services such as those provided by a services platform 113 and services 115a-115n (also collectively referred to as services 115). By way of example, the services 115 can include mapping service, navigation services, and/or other data services that provide data for determining road-vehicle friction change associated with a travel segment through the autonomous vehicle 101. In one embodiment, the services platform 113 and/or the services 115 interact with content providers 117a-117m that provides content data (e.g., map data, imaging data, etc.) to the services platform 113 and/or the services 115. In one embodiment, the UE 103 executes an application 119 that acts as a client to the services platform 113, the services 115, the vehicle configuration module 105, and/or the vehicle configuration platform 107. In one embodiment, the sensor data can be stored in a geographic database 122 for use by the vehicle configuration module 105 and/or the vehicle configuration platform 107. The geographic database 122 is explained in detail in conjunction with FIG. 1B.

The road-vehicle friction may be different for different roads or different segments of the road. For example, a travel segment of a road may be slippery for 100 meters and then non-slippery for next 50 meters. Similarly, a road may be dry however another road linking to this road may be slippery. Therefore, road-vehicle friction may change from one road to another. In one embodiment, the system 100 generates a guideline friction map by aggregating road-vehicle friction from multiple roads and road segments. In one embodiment, the guideline friction map aggregates the road-vehicle friction values for various segments of a road to determine average road-vehicle friction for the road. Further, the guideline friction map indicates road-vehicle friction for multiple roads. In one embodiment, the system 100 generates the guideline friction map by using information received from sensors 111 of the autonomous vehicle 101. Further, though not shown, information from multiple autonomous vehicles may be received at the system for generating the guideline friction map. In one embodiment, the guideline friction map may be provided to the autonomous vehicle 101 by the content providers 117a-117m through the services platform 113 and/or the services 115.

In one embodiment, the system 100 processes the data received from sensors 111 to determine a change in road-vehicle friction while travelling on a road segment. For example, the road-vehicle friction value may change (e.g., increase, decrease, or remain constant) after 1000 meters of travel segment.

In one embodiment, the system 100 compares the change with the guideline friction map for that travel segment. By way of example, the system 100 determines the location, position, or direction of motion of the vehicle based on information received from GPS (Global Positioning System) satellites 118. This information from the GPS satellites 118 may be used to identify the travel segment and accordingly determine average friction value for the travel segment from the guideline friction map.

In one embodiment, the system 100 determines a response action based on the comparison of the friction change on the travel segment with the friction value of the guideline friction map. The response action may correspond to change in operating mode (e.g., autonomous mode, manual mode) of the autonomous vehicle 101. Further, the system 100 determines an expected extent of friction change of the travel segment from the guideline friction map. By way of example, the expected extent of friction change corresponds to the distance of the travel segment (e.g., 100 meters) over which the friction will remain at this level.

In an exemplary scenario, the system 100 determines that the road-vehicle friction on the travel segment of the autonomous vehicle has decreased. In this case, the system 100 determines the expected friction change and the expected extent of the expected extent of friction change from the guideline friction map for that travel segment. If the decrease in the road-vehicle friction is similar to the expected friction change and the expected extent of the expected extent is less than a distance threshold (e.g., 50 meters), then the system 100 determines as a response to keep the operating mode of the autonomous vehicle as autonomous mode. In one embodiment, the distance threshold is predefined in the system 100. In another embodiment, the distance threshold may be determined based on criteria (e.g., weight of vehicle, direction of motion of the vehicle etc.).

In another exemplary scenario, the system 100 determines that the road-vehicle friction on the travel segment of the autonomous vehicle has decreased. In this case, the system 100 determines the expected friction change and the expected extent of the expected extent of friction change from the guideline friction map for that travel segment. If the decrease in the road-vehicle friction is similar to the expected friction change and the expected extent of the expected extent is greater than a distance threshold (e.g., 1000 meters), then the system 100 determines as a response to change the operating mode of the autonomous vehicle to manual mode.

In another exemplary scenario, the system 100 determines that the road-vehicle friction on the travel segment of the autonomous vehicle has decreased. In this case, the system 100 determines the expected friction change and the expected extent of the expected extent of friction change from the guideline friction map for that travel segment. If the decrease in the road-vehicle friction is similar to the expected friction change and the road-vehicle friction change is expected to be constant for this travel segment, then the system 100 determines as a response to change the operating mode of the autonomous vehicle to manual mode.

As noted previously, the autonomous vehicle 101 can communicate with the providers 117, the services platform 113 over the communication network 109. By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of embedded terminal, mobile terminal, fixed terminal, or portable terminal including a vehicle control unit, a head unit, a portable navigation device (PND), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.).

By way of example, the autonomous vehicle 101, the UE 103, the vehicle configuration module 105, the vehicle configuration platform 107, the sensors 111, and the application 119 communicate with each other and with other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the sensors 111 may be any type of sensor to detect information about the environment surrounding the autonomous vehicle 101. In some embodiments, the sensor system 111 may include a laser rangefinder/LIDAR unit, a radar unit, infrared, an inertial measurement unit, an image gathering device such as a camera, or a microphone. The sensor system 111 may also include sensors configured to monitor internal systems of the autonomous vehicle 101 (e.g., O2 monitor, fuel gauge, engine oil temperature, wheel speed sensors, etc.). One or more of the sensors 111 may be configured to be actuated separately or collectively in order to modify a position and/or an orientation of the one or more sensors 111. In certain embodiments, the sensors 111 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like.

Still further, the one or more sensors 111 may provide in-vehicle navigation services, wherein one or more location based services may be provided to the at least one UE 103 associated with the at least one user of the vehicle and/or at least one other UE 103 associated with the autonomous vehicle 101.

Figure 1B:
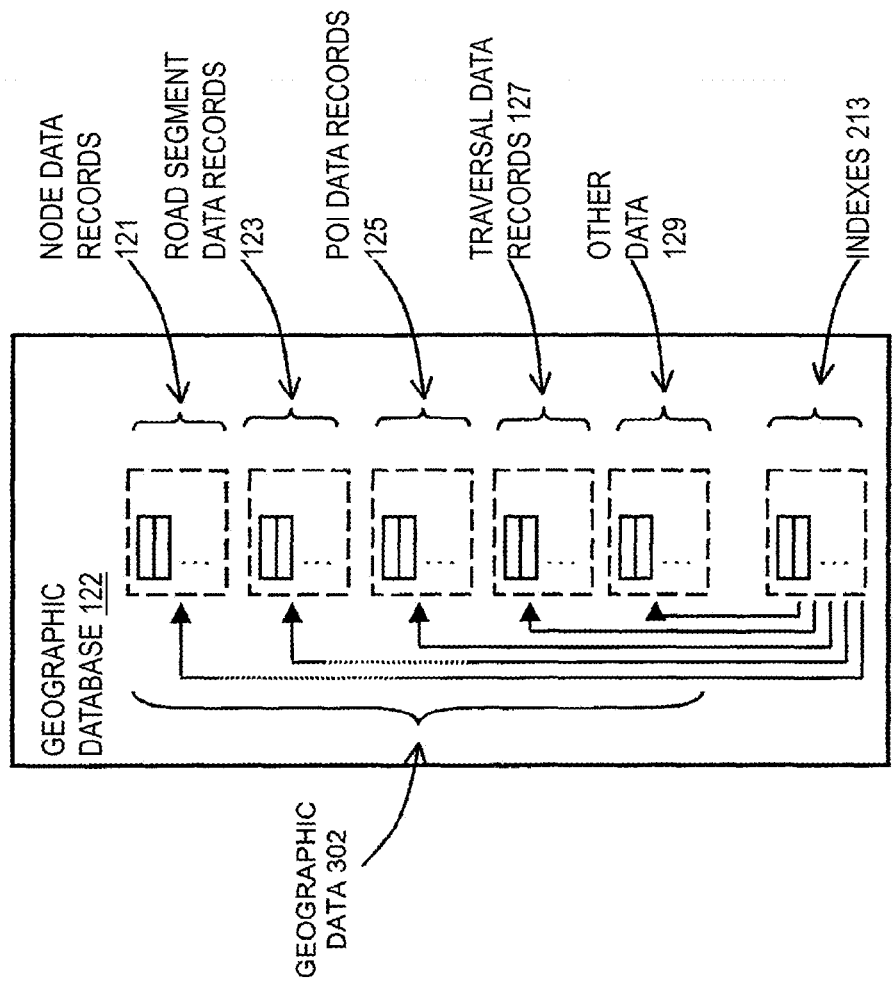
FIG. 1B is a diagram of a geographic database 122, according to one embodiment.

FIG. 1B is a diagram of a geographic database, according to one embodiment. In one embodiment, geographic data regarding the travel path or segment may be stored, associated with, and/or linked to the vehicle configuration platform 107 by way of the geographic database 122. The geographic or map database 122 includes geographic data used for (or configured to be compiled to be used for) navigation-related services. For example, the geographic database 122 may include node data records 121, road segment or link data records 123, POI data records 125, traversal data records 127, other data records 129, and indexes 213 to the geographic data 302. More, fewer or different data records may be provided. In one embodiment, the other data records 129 include cartographic ("carto") data records, routing data, friction data, and maneuver data.

In one embodiment, the road segment data records 123 are links or segments representing roads, streets, or paths. The node data records 121 are end points corresponding to the respective links or segments of the road segment data records 123. The road link data records 123 and the node data records 121 represent a road network, such as used by vehicles, cars, and/or other entities. Alternatively, the geographic database 122 contains travel path segment and node data records or other data that represent pedestrian paths, vehicular paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 122 may include data about the POIs and their respective locations in the POI data records 125. The geographic database 122 may also include data about places, such as cities, towns, or other communities, and other geographic features, such as bodies of water, mountain ranges, etc. Such place or feature data may be part of the POI data 125, such as a data point used for displaying or representing a position of a city. In addition, the geographic database 122 may include data about location-based events and their respective locations in the event data records 123. By way of example, the location-based events include any type of event that is associated with a particular location including, for instance, traffic, accidents, construction, public gatherings, etc.

In one embodiment, the geographic database 122 may include traversal data records 127 for determining trajectory paths through a transportation structure. For example, the traversal data records 127 may include sensor data collected from UEs 103 that contain location traces through one or more transportation structures. The traversal data records 127 may also store the baseline paths determined by the vehicle configuration platform 107 as well as the results of classifying other location traces with respect to the baseline paths. In yet another embodiment, the traversal data records 127 include the results of additional analytics for indicating the flow of traffic through transportation structures, the volume of traffic flows through the structures and the like. In some embodiments, the traversal data records 127 can be further segmented or categorized according to one or more contextual parameters (e.g., temporal parameters, mode of transport parameters, vehicle type).

The geographic database 122 may be maintained by the content provider 117 (e.g., a map developer) or the provider of the services 115. By way of example, the content providers or service providers may employ different approaches for generating and/or storing the geographic data. This may include, for example, obtaining data from other sources, such as municipalities or respective geographic authorities. In addition, the providers may employ field personnel to travel by vehicle along roads throughout a geographic region in order to observe features and/or record information descriptive of a travel path, its surrounding environment, etc. Also, the providers may employ remote sensing, such as aerial or satellite photography.

The geographic database 122 may be a master geographic database stored in a format that facilitates updating, maintenance and development. For example, the geographic database 122 or data in the geographic database 122 may be generated according to an Oracle spatial format or other spatial format for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, friction or traction functions, and other functions, by a navigation system or the autonomous vehicle. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the geographic database 122 may be a master geographic database, but in alternate embodiments, the database 122 may represent a compiled navigation database that may be used in or with UE 103 to provide navigation or map-related functions. In one embodiment, the geographic database 122 may include the guideline friction map data for the travel segments. For example, the database 122 may be used with the UE 103 to provide a vehicle with navigation features. In such a case, the database may be downloaded or stored on the UE 103, or the UE 103 may access the database 122 through a wireless or wired connection (such as via a server and/or network 109).

In one embodiment, the UE 103 may be an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the UE 103 is a cellular telephone for executing the application 119 to present guidance information and map displays. It is contemplated, in future embodiments, that the cellular telephone may be interfaced with an on-board navigation system of an autonomous vehicle or physically connected to the vehicle for serving as the navigation system.

Figure 2:
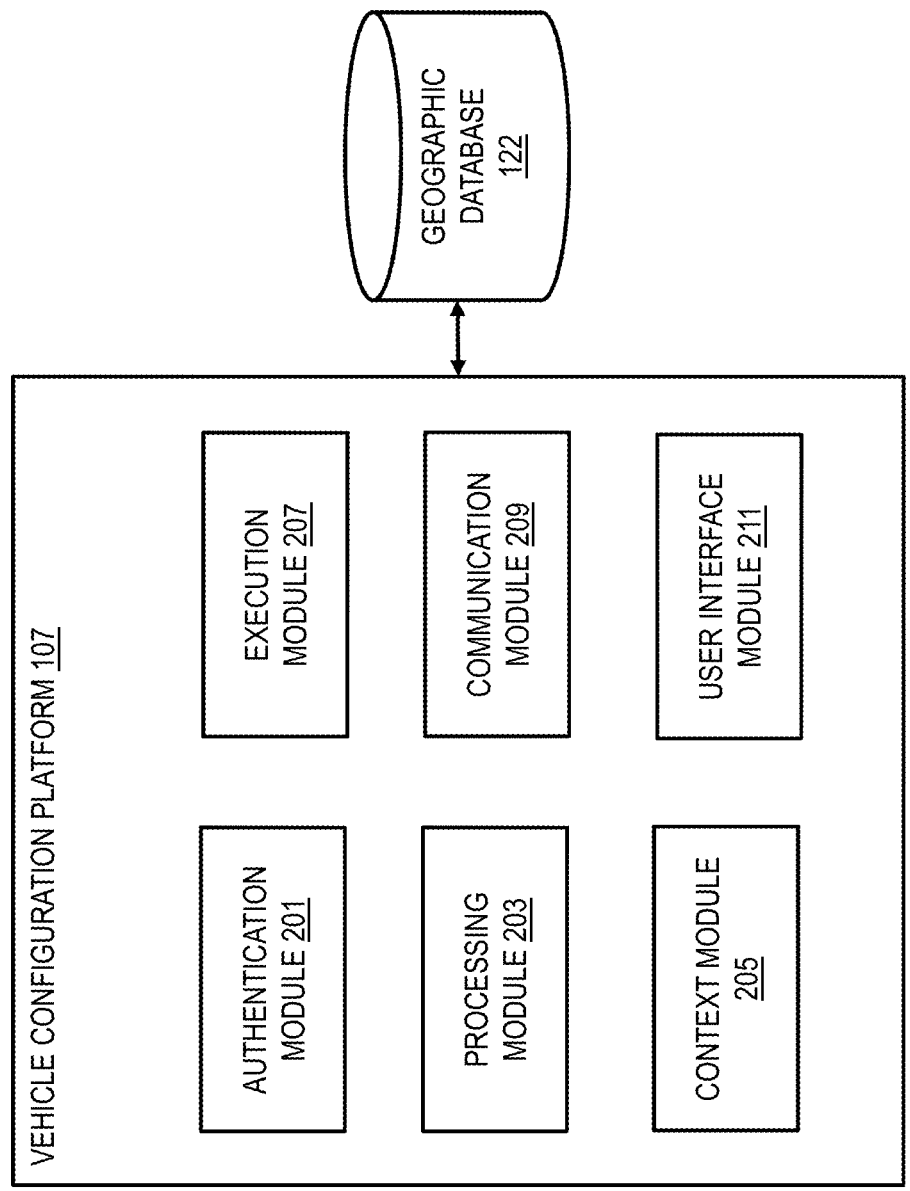
FIG. 2 is a diagram of the components of a vehicle configuration platform 107, according to one embodiment.

FIG. 2 is a diagram of the components of the vehicle configuration platform 107, according to one embodiment. By way of example, the vehicle configuration platform 107 includes one or more components for providing operational configuration for the autonomous vehicle. It is contemplated that the functions of these components may be combined in one or more components or performed by other components of equivalent functionality. In one embodiment, the vehicle configuration platform 107 includes an authentication module 201, a processing module 203, a context module 205, an execution module 207, a communication module 209 and a user interface module 211.

The authentication module 201 authenticates users and UE 103 for interaction with the vehicle configuration platform 107. By way of example, the authentication module 201 receives a request to access the vehicle configuration platform 107 via the application 119. The request may be submitted to the authentication module 201 via the communication module 209, which enables an interface between the application 119 and the vehicle configuration platform 107. In addition, the authentication module 201 may receive a first-time subscription request from a UE 103, a request to store a profile at database 122, a permission message validating consent by a UE 103 to share contextual information with the vehicle configuration platform 107, or a combination thereof. It is noted that the authentication module 201 may further be configured to support and/or validate the formation of profile by a provider of a service 115 or content provider 117, i.e., for supporting integration of the road-vehicle friction information with other types of data.

The processing module 203 operates in connection with the context module 205 to interpret road-vehicle friction data associated with one or more travel segments as the autonomous vehicle 101 navigates the travel paths. The context module 205 gathers the sensor information generated by the sensors of the UE 103 for specifying the friction, tire traction, acceleration, curvature, tilt, velocity, driving mode, brake pressure, etc., while the processing module 203 evaluates this information against various criteria. The criteria may include, for example, variance thresholds, discrepancy factors and other metrics that when fulfilled, indicate a response action associated with the autonomous vehicle.

Further, the processing module 203 determines an expected friction change value, an expected extent of the expected friction change value, or a combination thereof, for the travel segment. In one embodiment, the processing module 203 uses information from the guideline friction map stored in the geographic database 122 to determine the expected friction change value, the expected extent of the expected friction change value, or a combination thereof, for the travel segment.

In one embodiment, the execution module 207 generates the guideline friction map by aggregating road-vehicle friction from multiple roads and road segments. As previously noted, the guideline friction map is generated by aggregating the road-vehicle friction values for various segments of a road to determine average road-vehicle friction for the road. In one embodiment, the execution module 207 generates the guideline friction map by using information received from sensors 111 of the autonomous vehicle 101. Further, though not shown, information from multiple autonomous vehicles may be received at the system for generating the guideline friction map. In one embodiment, the execution module 207 processes the road-vehicle friction data to remove time-varying features from the aggregated road-vehicle friction data prior to the generation of the guideline friction map. The removal of time-varying features (e.g., slippery road due to rain for 2 hours) enables generation of effective and reliable guideline friction map.

In one embodiment, the execution module 207 determines a response action based on the comparison of the friction change on the travel segment with the friction value of the guideline friction map. For example, the execution module 207 compares the road-vehicle friction change to the expected road friction change, and the expected extent friction change with a distance threshold to generate the response action. The response action may correspond to change in operating mode (e.g., autonomous mode, manual mode) of the autonomous vehicle 101. As noted previously, the expected extent of friction change corresponds to the distance of the travel segment (e.g., 100 meters) over which the friction will remain at this level.

In an exemplary scenario, the execution module 207 determines that the road-vehicle friction on the travel segment of the autonomous vehicle has decreased. In this case, the execution module 207 determines the expected friction change and the expected extent of the expected extent of friction change from the guideline friction map for that travel segment. If the decrease in the road-vehicle friction is similar to the expected friction change and the expected extent of the expected friction change value is less than a distance threshold (e.g., 50 meters), then the execution module 207 determines as a response to keep the operating mode of the autonomous vehicle as autonomous mode. In one embodiment, the distance threshold is predefined in the vehicle configuration platform 107. In another embodiment, the distance threshold may be determined based on criteria (e.g., weight of vehicle, direction of motion of the vehicle etc.).

In another exemplary scenario, the execution module 207 determines that the road-vehicle friction on the travel segment of the autonomous vehicle has decreased. In this case, the execution module 207 determines the expected friction change and the expected extent of the friction change from the guideline friction map for that travel segment. If the decrease in the road-vehicle friction is similar to the expected friction change and the expected extent of the expected friction change value is greater than a distance threshold (e.g., 1000 meters), then the execution module 207 determines as a response to change the operating mode of the autonomous vehicle to manual mode.

In another exemplary scenario, the execution module 207 determines that the road-vehicle friction on the travel segment of the autonomous vehicle has decreased. In this case, the execution module 207 determines the expected friction change and the expected extent of the expected friction change from the guideline friction map for that travel segment. If the decrease in the road-vehicle friction is similar to the expected friction change and the road-vehicle friction change is expected to be constant for this travel segment, then the execution module 207 determines as a response to change the operating mode of the autonomous vehicle to manual mode. Per the executions performed by the execution module 207, current actions may be executed, prioritized, or queued for initiation at the vehicle based on the response action.

The execution module 207 may also operate in connection with the communication module 209 and user interface module 211 to cause the transmission or rendering of an instruction respectively. By way of example, the execution module 207 may trigger the user interface module 211, which executes one or more application programming interface (API) executions of the vehicle configuration module 105/platform 107 for presenting the response action associated with the travel segments. As another example, the execution module may trigger the communication module 209 to transmit an instruction for initiating a response action of the vehicle, per the UE 103, in response to the approaching of the vehicle to the corresponding travel segment of the travel path.

It is further noted that the user interface module 211 may operate in connection with the communication module 209 for facilitating the exchange of navigation information via the communication network 109 with respect to the services 115 and content providers 117.

The above presented modules and components of the vehicle configuration platform 107 can be implemented in hardware, firmware, software, or a combination thereof. Though depicted as a separate entity in FIG. 1A, it is contemplated that the vehicle configuration platform 107 may be implemented for direct operation by respective UEs 103. As such, the vehicle configuration platform 107 may generate direct signal inputs by way of the operating system of the UE 103 for interacting with the application 119. In another embodiment, one or more of the modules 201-211 may be implemented for operation by respective UEs as a vehicle configuration module 105, cloud based service, or combination thereof.

Figure 10:
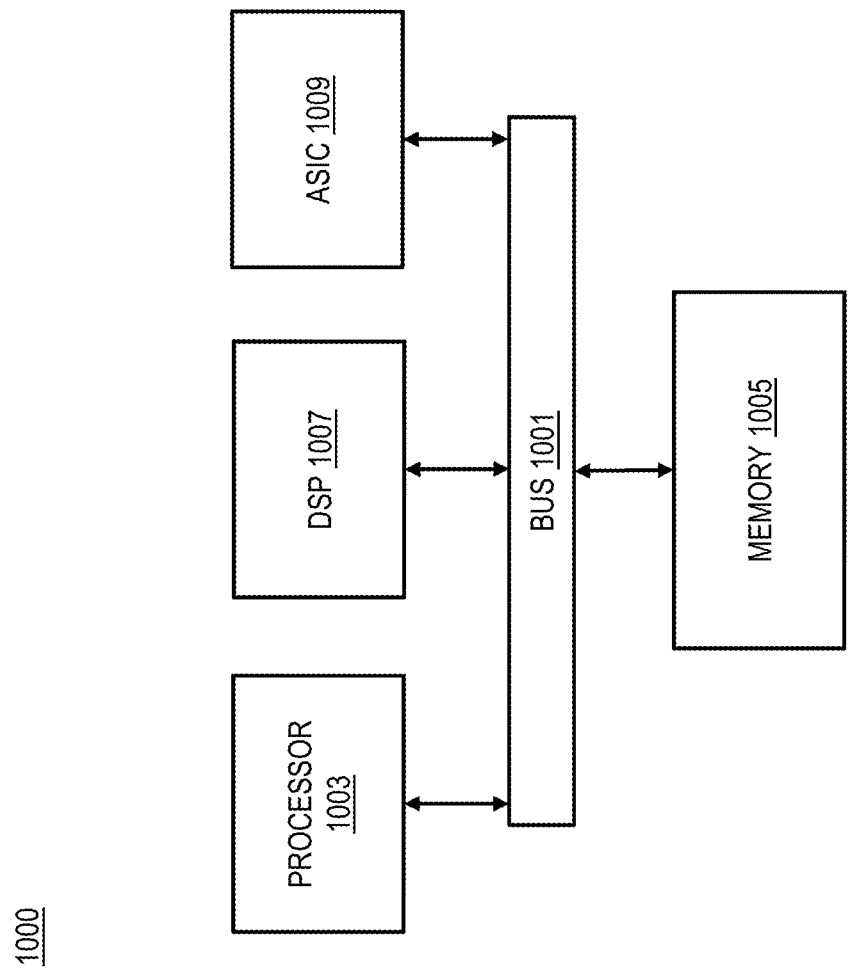
FIG. 10 is a diagram of a chip set that can be used to implement an embodiment of the invention, according to one embodiment.

FIG. 3A is a flowchart of a process for determining road surface friction data for at least one travel segment via sensor data and/or guideline friction map to cause at least one response action, according to one embodiment. In one embodiment, the vehicle configuration platform 107 performs the process 300 and is implemented in, for instance, a chip set including a processor and a memory as shown in FIG. 10.

In step 301, the vehicle configuration platform 107 may process and/or facilitate processing of sensor data in order to determine a road-vehicle friction change. As noted previously, the sensor data may be, but not restricted to, friction data associated with the autonomous vehicle 101. The road-vehicle friction change may be associated with a travel segment travelled through the autonomous vehicle 101, or a highly-assisted driving (HAD) vehicle, or a combination thereof.

In step 303, the vehicle configuration platform 107 may compare the road-vehicle friction change with the guideline friction map. In one embodiment, the comparison is based on an expected friction change value, an expected extent of the expected friction change value, or a combination thereof. In one embodiment, the vehicle configuration platform 107 may compare the road-vehicle friction change with the guideline friction map.

In step 305, the vehicle configuration platform 107 may determine a response action to the road-vehicle friction change. In one embodiment, the response action may include, but not restricted to, a change in operating mode of the autonomous vehicle 101. In one exemplary scenario, the change in operating mode of the autonomous vehicle may be, but not restricted to, from an autonomous mode to a manual mode of operation of the autonomous vehicle 101.

FIG. 3B is a flowchart of a process for determining friction change value for at least one travel segment, according to one embodiment. In one embodiment, the vehicle configuration platform 107 performs the process 300 and is implemented in, for instance, a chip set including a processor and a memory as shown in FIG. 10.

In step 307, the vehicle configuration platform 107 may determine an expected friction change value, an expected extent of the expected friction change value, or a combination thereof. The values are determined for the travel segment from the guideline friction map and the comparison of the step 303 may be based on the expected friction change value, the expected extent, or a combination thereof.

Figure 4:
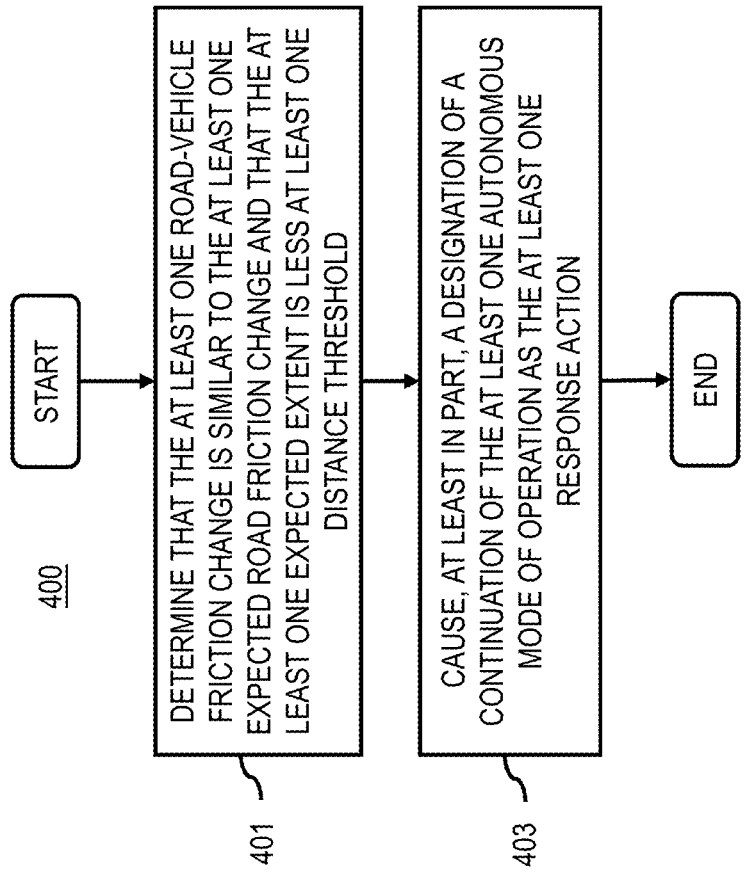
FIG. 4 is a flowchart of a process for determining autonomous mode of operation as a response action based, at least in part, on road-vehicle friction and/or distance threshold, according to one embodiment.

FIG. 4 is a flowchart of a process for determining autonomous mode of operation as a response action based, at least in part, on road-vehicle friction and/or distance threshold, according to one embodiment. In one embodiment, the vehicle configuration platform 107 performs the process 400 and is implemented in, for instance, a chip set including a processor and a memory as shown in FIG. 10.

As previously noted, the operating mode of the autonomous vehicle includes an autonomous mode and a manual mode. The vehicle configuration platform 107 controls the mode based on the road-vehicle friction change, extent of the change, or a combination thereof. Also, as previously noted these changes may be determined based on comparison with a guideline friction map.

In step 401, the vehicle configuration platform 107 determines that the road-vehicle friction change is similar to the expected road friction change and the expected extent of the friction change is less than a distance threshold. In one embodiment, the changes may be considered similar within a predefined difference. For example, the changes are considered similar within 7% of each other. A person skilled in the art will appreciated that any other mathematical algorithm may be used to define the similarity. In one embodiment, the vehicle configuration platform 107 may observe a change in friction over an extended time period to cause a generation of a road repair warning. In one scenario, the vehicle configuration platform 107 may map road sections that are likely to require road surface repair. If the average friction for a portion of road is observed to degrade and stay degraded for a long period of time, the vehicle configuration platform 107 may estimate that the road quality has permanently become worse over time. Therefore, the vehicle configuration platform 107 not only knows the road has low friction quality, but also that it used to be better. In one scenario, this information may be used as feedback to the department of transportation to indicate the road needs repair and/or inform drivers that the friction has changed since they last drove the road.

Thereafter, in step 403, the vehicle configuration platform 107 causes the autonomous vehicle 101 to continue in the autonomous mode operating mode. In one embodiment, the response action to continue in the autonomous mode may be presented on a user interface of UE 103. For example, the response action may be displayed, presented as an audio prompt, or a combination thereof.

FIG. 5 is a flowchart of a process for determining manual mode of operation as a response action based, at least in part, on road-vehicle friction and/or distance threshold, according to one embodiment. In one embodiment, the vehicle configuration platform 107 performs the process 500 and is implemented in, for instance, a chip set including a processor and a memory as shown in FIG. 10

In step 501, the vehicle configuration platform 107 determines that the road-vehicle friction change is similar to the expected road friction change and the expected extent is greater than the distance threshold. As noted previously, the comparisons are based on the guideline friction map for the travel segment.

Thereafter, in step 503, the vehicle configuration platform 107 causes the autonomous vehicle 101 to change the operating mode of the autonomous vehicle 101 to a manual mode. In one embodiment, the response action to continue in the autonomous mode may be presented on a user interface of UE 103.

FIG. 6A is a flowchart of a process for causing, at least in part, a change in the operating mode of an autonomous vehicle based, at least in part, on road-vehicle friction change, according to one embodiment. In one embodiment, the vehicle configuration platform 107 performs the process 600 and is implemented in, for instance, a chip set including a processor and a memory as shown in FIG. 10.

In step 601, the vehicle configuration platform 107 determines that the road-vehicle friction change is similar to the expected road friction change and the road-vehicle friction change is expected to be constant for the travel segment. As noted previously, the comparisons are based on the guideline friction map for the travel segment.

Thereafter, in step 603, the vehicle configuration platform 107 causes the autonomous vehicle 101 to change the operating mode of the autonomous vehicle 101. In one embodiment, the vehicle configuration platform 107 causes the autonomous mode to change to a manual mode of operating of the autonomous vehicle 101. In one embodiment, the response action to continue in the autonomous mode may be presented on a user interface of UE 103.

FIG. 6B is a flowchart of a process for selecting incident reports for a friction related event in a travel segment, according to one embodiment. In one embodiment, the vehicle configuration platform 107 performs the process 600 and is implemented in, for instance, a chip set including a processor and a memory as shown in FIG. 10.

In step 605, the vehicle configuration platform 107 receives at least one incident report regarding at least one friction related event associated with the at least one travel segment. In one example embodiment, the vehicle probes may continuously report dangerous driving flag at a specific location to the vehicle configuration platform 107. Then, the vehicle configuration platform 107 to reduce false incident reports may consult the historical friction map and/or relative friction map.

In step 607, the vehicle configuration platform 107 determines whether to ignore the at least one incident report based, at least in part, on the at least one guideline friction map. In one example embodiment, the vehicle configuration platform 107 may consult the received dangerous driving flags with the historical friction maps and/or the relative friction maps. If these maps indicate that vehicles always experience a short lived road quality issue at this specific location, the vehicle configuration platform 107 may ignore the probe flags. However, if the maps indicate that historical friction remains constant, the vehicle configuration platform 107 may have a higher confidence that the probes really indicate an unusual dangerous driving condition.

FIG. 7A is a flowchart of a process for generating a guideline friction map for the autonomous vehicle, according to one embodiment. In one embodiment, the vehicle configuration platform 107 performs the process 700 and is implemented in, for instance, a chip set including a processor and a memory as shown in FIG. 10.

In step 701, the vehicle configuration platform 107 aggregate friction data for the travel segment, one or more travel segments, or a combination thereof, by using the sensors 111. In one embodiment, the friction data associated with the autonomous vehicle 101 is collected under standard conditions for the travel segment, one or more travel segments, or a combination thereof. Further, the vehicle configuration platform 107 gathers the friction data over a period of time and stores it in geographic database 122.

Per step 703, the vehicle configuration platform 107 processes the aggregated friction data for the travel segment, one or more travel segments, or a combination thereof, in order to generate a guideline friction map. In one embodiment, the vehicle configuration platform 107 processes and/or facilitates processing of the friction data in order to remove time-varying features from the friction data prior to the generation of the guideline friction map. By way of example, time-varying features include friction changes over short durations or environmental conditions such as rain, snow, mud, or a combination thereof.

FIG. 7B is a flowchart of a process for removing time varying features from a friction before generating a friction map, according to one embodiment. In one embodiment, the vehicle configuration platform 107 performs the process 700 and is implemented in, for instance, a chip set including a processor and a memory as shown in FIG. 10.

In step 705, the vehicle configuration platform 107 may process and/or facilitate a processing of the friction data to cause, at least in part, a removal of one or more time-varying features from the friction prior to the generation of the at least one friction map. In one scenario, the friction data is collected over a period of time under standard conditions for the at least one travel segment, the one or more other travel segments, or a combination thereof.

The processes described herein for determining road surface friction data for at least one travel segment via sensor data and/or guideline friction map to cause at least one response action may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIGS. 8A and 8B are diagrams for depicting interaction between the vehicle configuration platform 107 and a vehicle navigating along a travel path, according to various example embodiments. In FIG. 8A, the travel path 801 includes various nodes labeled A, B, C, and D as well as various corresponding links labeled Link A, Link B, Link C, and Link D. Per this example, Link A is comprised of two segments 803 and 805, Link B is comprised of four segments 807-813, Link C is comprised of three segments 815-819, and Link D is comprised of one segment 821. Also, for the purpose of example, Links A, B and C represent contiguous sections of the travel path 801. It is noted that each of the segments 803-821 represent a segment of the travel path 801.

As depicted in FIG. 8A, a guideline friction value 823 depicts an expected road-vehicle friction change value between the segments 805 and 807. Similarly, a guideline friction value 825 depicts an expected road-vehicle friction change value between the segments 813 and 815, and a guideline friction value 827 depicts an expected road-vehicle friction change value between the segments 819 and 821. Therefore, FIG. 8A depicts the guideline friction map for the travel path 801. As noted previously, the guideline friction values 823-827 may be generated by aggregating road-vehicle friction for travel segments 803-821 over a time period. For purpose of illustration, the length/distance of each of the segments 803-821 is same. Further, for the purpose of illustration, the road-vehicle friction value of the segments 807-819 of the Link B and Link C are reducing over their lengths (i.e., road-vehicle friction of the segment 811 is less than road-vehicle friction of the segment 807), while the road-vehicle friction of the segment 821 is constant.

As per an exemplary scenario depicted in FIG. 8B, the autonomous vehicle is travelling on the travel path 801 from the travel segment 805 of Link A towards the segment 807 of Link B. Further, for the purpose of illustration it is assumed that the length/distance of each of the segments 803-821 is 50 meters, and the distance threshold is 180 meters. By way of example, when the vehicle reaches segment 807 of Link B, the road-vehicle friction changes as compared to road-vehicle friction of segment 805 (i.e., the road-vehicle friction of segment 807 is less than that of segment 805). In this case, a road-vehicle friction change 829 is compared with the expected friction change or guideline friction value 823. If this change (i.e., road-vehicle friction change 829) is similar to the expected friction change 823, and it is determined that the expected extent (i.e., total length 200 meters of segments 807-813) is more than a distance threshold (i.e., 180 meters), then the operating mode of the autonomous vehicle is changed to manual mode.

As per another exemplary scenario depicted in FIG. 8B, the autonomous vehicle is travelling on the travel path 801 from the travel segment 813 of Link B towards the segment 815 of Link C. Further, for the purpose of illustration it is assumed that the length/distance of each of the segments 803-821 is 50 meters, and the distance threshold is 180 meters. By way of example, when the vehicle reaches segment 815 of Link C, the road-vehicle friction of the segment 813 changes as compared to road-vehicle friction of segment 815 (i.e., the road-vehicle friction of segment 815 is less than that of segment 813). In this case, a road-vehicle friction change 831 is compared with the expected friction change or guideline friction value 825 of the guideline friction map. If this change (i.e., road-vehicle friction change 831) is similar to the expected friction change 825, and it is determined that the expected extent (i.e., total length 150 meters of segments 815-819) is less than a distance threshold (i.e., 180 meters), then the operating mode of the autonomous vehicle is kept as autonomous.

As per another exemplary scenario depicted in FIG. 8B, the autonomous vehicle is travelling on the travel path 801 from the travel segment 819 of Link C towards the segment 821 of Link D. Further, for the purpose of illustration it is assumed that the length/distance of each of the segments 803-821 is 50 meters, and the distance threshold is 180 meters. By way of example, when the vehicle reaches segment 821 of Link D, the road-vehicle friction of the segment 819 changes as compared to the road-vehicle friction of segment 821. In this case, a road-vehicle friction change 833 is compared with the expected friction change or guideline friction value 827 of the guideline friction map. If this change (i.e., road-vehicle friction change 833) in the road-vehicle friction is similar to the expected friction change 827, and it is determined that the road-vehicle friction of the segment 821 remains constant, then the operating mode of the autonomous vehicle is changed to manual.

Figure 8C:
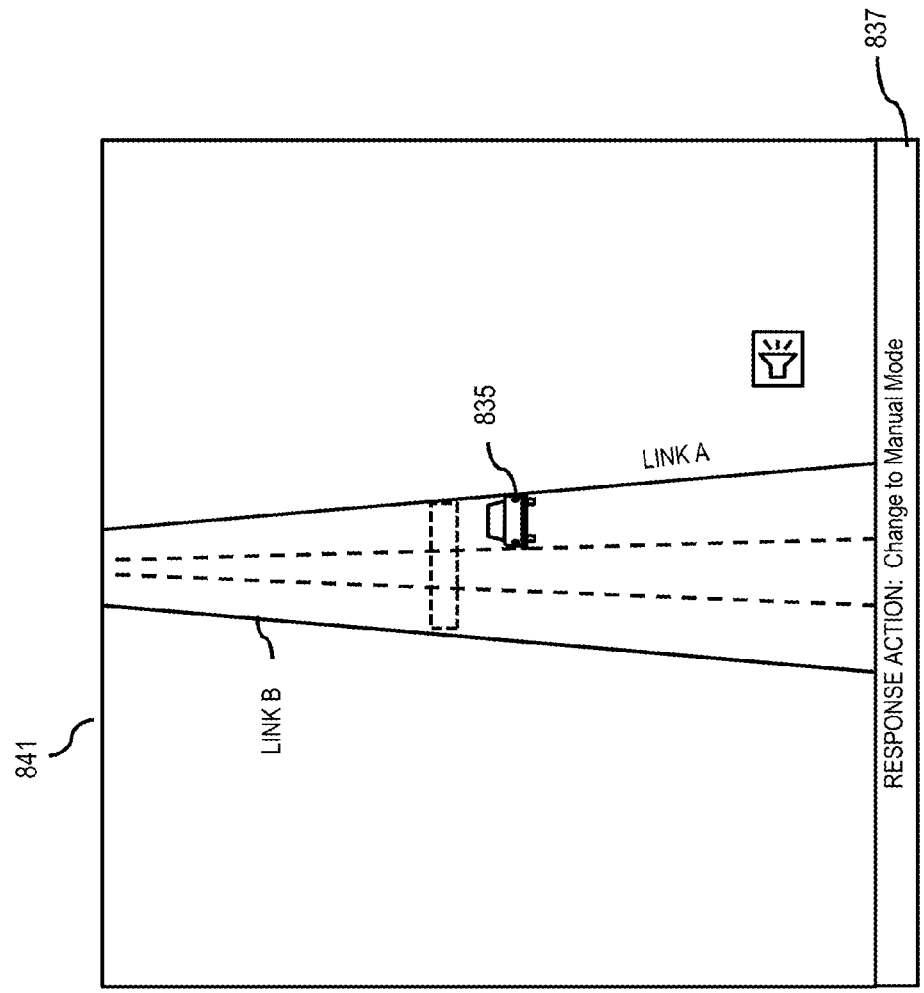
FIG. 8C is a diagram of a user interface for presenting a response action based on a operational configuration of vehicles, according to one embodiment

Further, an instruction 837 for the vehicle to change the mode to manual may be rendered to a display 841 of a user device, as depicted in FIG. 8C. Also, information for depicting the location of the car (as an icon 835) relative to the position of impending Link B is shown to the interface 841. In one embodiment, the information 837 may be presented in advance of execution of the instruction for the benefit of the driver.

The processes described herein for determining road surface friction data for at least one travel segment via sensor data and/or guideline friction map to cause at least one response action may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
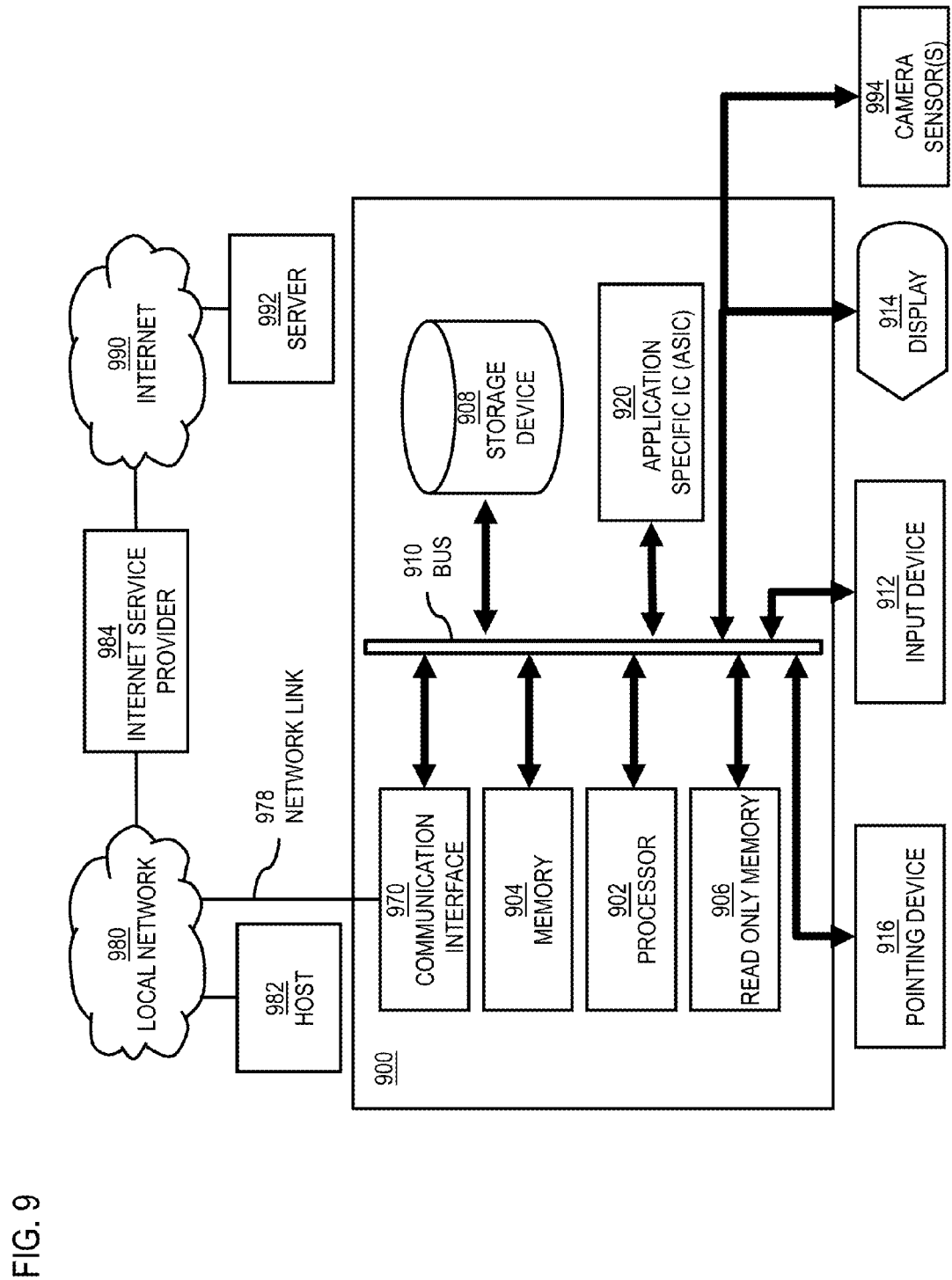
FIG. 9 is a diagram of hardware that can be used to implement an embodiment of the invention, according to one embodiment.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 1A can deploy the illustrated hardware and components of system 900. Computer system 900 is programmed (e.g., via computer program code or instructions) to determine road surface friction data for at least one travel segment via sensor data and/or guideline friction map to cause at least one response action as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining road surface friction data for at least one travel segment via sensor data and/or guideline friction map to cause at least one response action.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determining road surface friction data for at least one travel segment via sensor data and/or guideline friction map to cause at least one response action. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for determining road surface friction data for at least one travel segment via sensor data and/or guideline friction map to cause at least one response action. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining road surface friction data for at least one travel segment via sensor data and/or guideline friction map to cause at least one response action, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 maybe omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for determining road surface friction data for at least one travel segment via sensor data and/or guideline friction map to cause at least one response action to the UE 103.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer system 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine road surface friction data for at least one travel segment via sensor data and/or guideline friction map to cause at least one response action as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining road surface friction data for at least one travel segment via sensor data and/or guideline friction map to cause at least one response action.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine road surface friction data for at least one travel segment via sensor data and/or guideline friction map to cause at least one response action. The memory 1005 also stores the data associated with or generated by the execution of the inventive steps.

Figure 11:
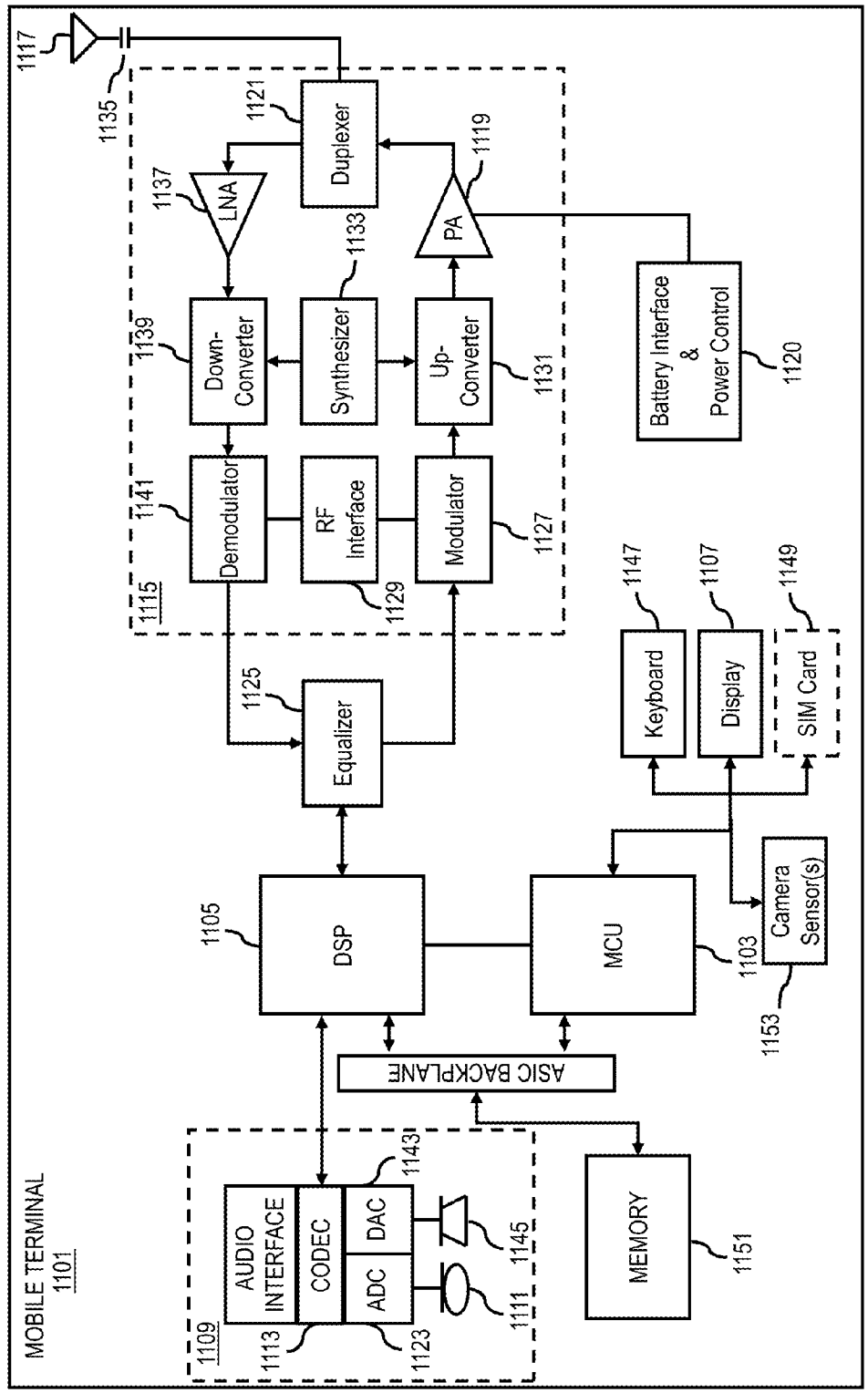
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1A, according to one embodiment. In some embodiments, mobile terminal 1101, or a portion thereof, constitutes a means for performing one or more steps of determining road surface friction data for at least one travel segment via sensor data and/or guideline friction map to cause at least one response action. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining road surface friction data for at least one travel segment via sensor data and/or guideline friction map to cause at least one response action. The display 1107 includes display circuitry configured to display at least a portion of a user interface of the mobile terminal (e.g., mobile telephone). Additionally, the display 1107 and display circuitry are configured to facilitate user control of at least some functions of the mobile terminal An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine road surface friction data for at least one travel segment via sensor data and/or guideline friction map to cause at least one response action. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other nonvolatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile terminal 1101 wherein the one or more camera sensors may be placed at one or more locations on the mobile terminal. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for effectuating a mode of operation in an autonomous vehicle, comprising:
    processing sensor data associated with the autonomous vehicle to determine at least one sensed road-vehicle friction change associated with at least one travel segment, wherein the autonomous vehicle is operating in an autonomous mode;
    calculating at least one expected friction change from friction data of at least one guideline friction map for the at least one travel segment, wherein the friction data of the at least one guideline friction map is aggregated from a plurality of vehicles that previously traveled on the at least one travel segment;
    comparing the at least one sensed road-vehicle friction change to the at least one expected friction change; and
    determining at least one response action to change the mode of operation of the autonomous vehicle from the autonomous mode to a manual mode based on the comparison.

2. The method of claim 1, further comprising:
    determining at least one expected extent of the at least one expected friction change value for the at least one travel segment from the at least one guideline friction map.

3. The method of claim 1, further comprising:
    determining that the at least one sensed road-vehicle friction change is similar to the at least one expected road friction change and that the at least one expected extent is less than at least one distance threshold; and
    designating a continuation of the autonomous mode of operation as the at least one response action.

4. The method of claim 1, further comprising:
    determining that the at least one sensed road-vehicle friction change is similar to the at least one expected road friction change and that the at least one expected extent is greater than at least one distance threshold; and
    designating a change to the manual mode of operation as the at least one response action.

5. The method of claim 1, further comprising:
    determining that the at least one sensed road-vehicle friction change is similar to the at least one expected road friction change and that the at least one sensed road-vehicle friction change is expected to be constant for the at least one travel segment; and
    designating a change to at least one manual mode of operation as the at least one response action.

6. The method of claim 1, further comprising:
    receiving at least one incident report regarding at least one friction related event associated with the at least one travel segment; and
    determining whether to ignore the at least one incident report based on the at least one guideline friction map.

7. The method of claim 1, wherein the friction data is collected under standard conditions for the at least one travel segment, the one or more other travel segments, or a combination thereof.

8. A method of claim 1, wherein the friction data is collected over a period of time, the method further comprising:
    processing the friction data to cause a removal of one or more time-varying features from the friction data prior to the generation of the at least one guideline friction map.

9. The method of claim 1, further comprising:
    determining the at least one road-vehicle friction change based on a difference in a first friction value at a first point and a second friction value measured with respect to a same vehicle traveling between the first point and the second point.

10. The method of claim 1, wherein the at least one guideline friction map maps the friction data based on road surface conditions for a road network including the at least one travel segment.

11. The method of claim 1, further comprising:
presenting a notification to the user in the autonomous vehicle for effectuating the change in the mode of operation of the autonomous vehicle.

12. The method of claim 11, further comprising:
requesting a user interaction for authenticating the change in the mode of operation of the autonomous vehicle.

13. The method of claim 1, wherein the aggregation of the friction data of the at least one guideline friction map comprises:
calculating a friction profile for each of the plurality of vehicles used in generating the at least one guideline friction map, wherein the friction profile represents absolute friction values along the at least one travel segment for said each of the plurality of vehicles;
normalizing the absolute friction values based on a slope of the friction profile for said each of the plurality of vehicles,
wherein the friction data of the at least one guideline friction map is aggregated from the normalized absolute friction values.

14. The method of claim 13, further comprising:
calculating a friction bias based on the friction profile for said each of the plurality of vehicles; and
normalizing the absolute friction values based on the friction bias for said each of the plurality of vehicles.

15. An apparatus comprising:
at least one processor; and
at least one memory including computer program code for one or more programs,
the at least one memory and the computer program code configured to, with the at least one processor, cause the apparatus to perform at least the following,
process sensor data associated with an autonomous vehicle to determine at least one sensed road-vehicle friction change associated with at least one travel segment, wherein the autonomous vehicle is operating in an autonomous mode;
calculate at least one expected friction change from friction data of at least one guideline friction map for the at least one travel segment, wherein the friction data of the at least one guideline friction map is aggregated from a plurality of vehicles that previously traveled on the at least one travel segment;
compare the at least one sensed road-vehicle friction change to the at least one expected friction change; and
determine at least one response action to change a mode of operation of the autonomous vehicle from the autonomous mode to a manual mode based on the comparison.

16. The apparatus of claim 15, wherein the apparatus is further caused to:
determine at least one expected extent of the at least one expected friction change value for the at least one travel segment from the at least one guideline friction map.

17. The apparatus of claim 15, wherein the apparatus is further caused to:
determine that the at least one sensed road-vehicle friction change is similar to the at least one expected road friction change and that the at least one expected extent is less than at least one distance threshold; and
designate a continuation of the autonomous mode of operation as the at least one response action.

18. The apparatus of claim 15, wherein the apparatus is further caused to:
determine that the at least one sensed road-vehicle friction change is similar to the at least one expected road friction change and that the at least one expected extent is greater than at least one distance threshold; and
designate a change to at least one manual mode of operation as the at least one response action.

19. The apparatus of claim 15, wherein the apparatus is further caused to:
determine that the at least one sensed road-vehicle friction change is similar to the at least one expected road friction change and that the at least one sensed road-vehicle friction change is expected to be constant for the at least one travel segment; and
designate a change to at least one manual mode of operation as the at least one response action.

20. The apparatus of claim 15, wherein the apparatus is further caused to:
receive at least one incident report regarding at least one friction related event associated with the at least one travel segment; and
determine whether to ignore the at least one incident report based on the at least one guideline friction map.

21. A non-transitory computer-readable storage medium carrying one or more sequences of one or more instructions which, when executed by one or more processors, cause an apparatus to perform:
process sensor data associated with the autonomous vehicle to determine at least one sensed road-vehicle friction change associated with at least one travel segment, wherein the autonomous vehicle is operating in an autonomous mode;
calculate at least one expected friction change from friction data of at least one guideline friction map for the at least one travel segment, wherein the friction data of the at least one guideline friction map is aggregated from a plurality of vehicles that previously traveled on the at least one travel segment
compare the at least one sensed road-vehicle friction change to the at least one expected friction change guideline friction map; and
determine at least one response action to change a mode of operation of the autonomous vehicle from the autonomous mode to a manual mode based on the comparison.

22. The non-transitory computer-readable storage medium of claim 21, wherein the apparatus is further caused to perform:
determine at least one expected extent of the at least one expected friction change value for the at least one travel segment from the at least one guideline friction map.